United States Patent
Apte et al.

(10) Patent No.: US 10,162,611 B2
(45) Date of Patent: *Dec. 25, 2018

(54) METHOD AND APPARATUS FOR BUSINESS RULE EXTRACTION

(71) Applicant: SYNTEL, INC., Troy, MI (US)

(72) Inventors: Abhijit Apte, Maharashtra (IN); Abhishek Negi, Maharashtra (IN); Vivek Rao, Maharashtra (IN); Amit Pundeer, Maharashtra (IN); Sagar Kulkarni, Maharashtra (IN); Prashant Ladha, Maharashtra (IN); Shashank Moghe, Maharashtra (IN); Vedavyas Rallabandi, Chennai (IN); Ravi Shankar, Maharashtra (IN); Lopamudra Dhal, Maharashtra (IN); Prabhat Parey, Maharashtra (IN); Abhishek Agarwal, Maharashtra (IN); Rahul Mehra, Maharashtra (IN)

(73) Assignee: Syntel, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,486

(22) Filed: Jan. 3, 2017

(65) Prior Publication Data

US 2017/0192777 A1    Jul. 6, 2017

Related U.S. Application Data

(60) Provisional application No. 62/441,785, filed on Jan. 3, 2017, provisional application No. 62/274,488, filed on Jan. 4, 2016.

(51) Int. Cl.
*G06F 9/45* (2006.01)
*G06F 8/41* (2018.01)
(Continued)

(52) U.S. Cl.
CPC ............ *G06F 8/427* (2013.01); *G06F 8/51* (2013.01); *G06F 8/76* (2013.01); *G06F 17/303* (2013.01);
(Continued)

(58) Field of Classification Search
CPC ..................................................... G06F 8/427
(Continued)

(56) References Cited

U.S. PATENT DOCUMENTS 6,170,078 B1    1/2001  Erle et al.
7,707,007 B2    4/2010  Campbell
(Continued)

FOREIGN PATENT DOCUMENTS

WO    2004077215 A2    9/2004

OTHER PUBLICATIONS

RES—A Pure Java Open Source COBOL to Java Translator (Aug. 1, 2010, 9 pgs.).
(Continued)

*Primary Examiner* — Chameli Das
(74) *Attorney, Agent, or Firm* — Dykema Gossett PLLC (57) ABSTRACT

A method and apparatus for migration of application source code may include parsing the source code and generating a first output, dynamically analyzing the source code to produce a second output wherein the second output comprises at least business rule metadata associated with the application, converting, using the at least business rule metadata, the source code of the application in an original language to a destination language on the second platform and a data source in an assigned format to a destination format. The method may include simulating memory to execute the source code by creating a dynamic memory array, executing the source code within the dynamic memory array, detecting and resolving parameters of the source code by monitoring
(Continued)

execution of the source code, and storing the detected and resolved parameters of the source code in a metadata register.

16 Claims, 6 Drawing Sheets

(51) Int. Cl.
  *G06F 17/30* (2006.01)
  *G06F 8/76* (2018.01)
  *G06F 8/51* (2018.01)
  *G06Q 10/10* (2012.01)
  *G06Q 10/08* (2012.01)

(52) U.S. Cl.
  CPC .. *G06F 17/30684* (2013.01); *G06F 17/30705* (2013.01); *G06Q 10/087* (2013.01); *G06Q 10/10* (2013.01)

(58) Field of Classification Search
  USPC .......................................................... 717/137
  See application file for complete search history.

(56) References Cited

U.S. PATENT DOCUMENTS

| | | | |
|---|---|---|---|
| 7,996,413 | B2 | 8/2011 | Cotichini et al. |
| 9,389,890 | B2* | 7/2016 | Hamby .................. G06F 8/41 |
| 9,390,260 | B2* | 7/2016 | Tan ...................... G06F 8/427 |
| 2002/0178233 | A1* | 11/2002 | Mastrianni .............. G06F 8/60 709/217 |
| 2003/0188299 | A1 | 10/2003 | Broughton et al. |
| 2005/0097521 | A1 | 5/2005 | Liu |
| 2005/0102572 | A1 | 5/2005 | Oberlaender |
| 2005/0262191 | A1* | 11/2005 | Mamou ............. G06F 17/30563 709/203 |
| 2006/0067436 | A1* | 3/2006 | Potkonjak ........... H03M 13/395 375/341 |
| 2006/0277531 | A1 | 12/2006 | Horwitz et al. |
| 2007/0050343 | A1* | 3/2007 | Siddaramappa .. G06F 17/30908 |
| 2007/0067756 | A1 | 3/2007 | Garza |
| 2008/0005619 | A1* | 1/2008 | Arons ................ G06F 11/3604 714/38.1 |
| 2008/0306986 | A1 | 12/2008 | Doyle, Sr. |
| 2009/0064091 | A1 | 3/2009 | Tonkin et al. |
| 2009/0164491 | A1* | 6/2009 | Cotichini ............. G06F 17/303 |
| 2010/0107119 | A1* | 4/2010 | Libert ............... G06F 17/30126 715/810 |
| 2011/0270597 | A1 | 11/2011 | Baumgartner et al. |
| 2013/0339185 | A1* | 12/2013 | Johnson ................. H04W 4/02 705/26.8 |
| 2014/0372992 | A1 | 12/2014 | Yoon et al. |
| 2015/0040097 | A1 | 2/2015 | Martin et al. |
| 2015/0089063 | A1 | 3/2015 | Soni et al. |
| 2015/0331681 | A1* | 11/2015 | Rose ...................... G06F 8/437 717/143 |
| 2016/0070724 | A1* | 3/2016 | Marrelli ........... G06F 17/30303 707/692 |
| 2017/0116007 | A1* | 4/2017 | Cimadamore .......... G06F 8/315 |

OTHER PUBLICATIONS

IBM Resource Access Control Facility (RACF), Resource Access Control Facility (Jun. 2016, 1 pg.).
Application Analyzer: Technology Suite: TCS Master Craft: Offerings: Home (2 pgs.), retrieved from https://archive.org/web/ (Wayback Machine) with date of Jan. 22, 2014.
Rule Extraction Workbench: Transform Suite: TCS Master Craft: Offerings: TCS (2 pgs.), retrieved on-line on Oct. 15, 2015.
Application Transformer: Transform Suite: TCS Master Craft: Offerings: Home (1 pgs.), retrieved from https://archive.org/web/ (Wayback Machine) with date of Jan. 22, 2014.
Application Analysis and Visualization—Micro Focus Enterprise Analyzer (2 pgs.), retrieved from https://archive.org/web/ (Wayback Machine) with date of Jan. 16, 2014.
Metalogic Systems, "Insight AMS" (2 pgs.), retrieved from https://archive.org/web/ (Wayback Machine) with date of Mar. 16, 2014.
Eranca "Solution" (5 pgs.), dated Mar. 10, 2015.
Accenture "Accenture Cloud Application Migration Services", A smarter way to get to the cloud (8 pgs.), dated 2014.
IBM Tivoli Workload Scheduler, User's Guide and Reference, Version 9, Release 2 (836 pgs.), dated 2014.
CA Workload Automation CA 7 Edition, CA Technologies (8 pgs.), retrieved from https://archive.org/web/ (Wayback Machine) with date of Feb. 27, 2016.
What's New in BMC Control-M 8, Product Data Sheet, (2 pgs.), dated Oct. 2012.
CA Unified Infrastructure Management—CA Technologies (6 pgs.), retrieved from https://archive.org/web/ (Wayback Machine) with date of Apr. 21, 2014.
IBM Resource Access Control Facility (RACF), Resource Access Control Facility (1 pg), dated Nov. 2008.
CA Top Secret—CA Technologies, Ensure Scalable and Streamlined Mainframe Security (7 pgs.), dated Jul. 29, 2015.
CA ACF2 for z/OS, Quick Reference Guide (r 12) (3rd Edition, 101 pgs.), dated 2009.
Active Directory, Chapter 11 from Introducing Windows 2000 Server, Microsoft Press (14 pgs.), dated Dec. 9, 2009.
CA View—CA Technologies (6 pgs.), retrieved from https://archive.org/web/ (Wayback Machine) with date of Feb. 20, 2016.
CA Deliver—CA Technologies (6 pgs.), retrieved from https://archive.org/web/ (Wayback Machine) with date of Feb. 27, 2016.
IBM FileNet P8 Platform V 5.21 publication library (4 pg.), retrieved from https://archive.org/web/ (Wayback Machine) with date of Feb. 17, 2015.
Virtual Machinery—Sidebar 2—The Halstead Metrics (4 pgs.), retrieved from https://archive.org/web/ (Wayback Machine) with date of Sep. 23, 2014.
McCabe Cyclomatic Complexity (2 pgs.), retrieved from https://archive.org/web/ (Wayback Machine) with date of May 15, 2014.

* cited by examiner

METHOD AND APPARATUS FOR BUSINESS RULE EXTRACTION

CROSS REFERENCE TO RELATED APPLICATION

This application claims the benefit of, and priority to, U.S. Patent Application No. 62/441,785, filed Jan. 3, 2017 (the '785 application) and U.S. Patent Application No. 62/274,488, filed Jan. 4, 2016 (the '488 application). The '785 application and the '488 application are hereby incorporated by reference as though fully set forth herein.

TECHNICAL FIELD

The present disclosure relates generally to a method and apparatus for business rule extraction from computer source code, and more particularly to a method and apparatus for business rule extraction for the migration of such source code.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

There is a desire for current or modern computer systems running applications to be agile, proactive, flexible and prescriptive in real-time. Modernizing legacy applications may resolve these problems and may help users migrate applications to modern applications that may offer cloud adoption, digital and analytical capabilities. Some challenges in analyzing legacy applications may include the amount of time required to migrate legacy systems and the related impact on business operations, including costs and personnel requirements, errors may creep into a manual migration method increasing the risks to business operations, and the ability to find the right resources to perform migration of legacy applications.

There is, therefore, a need for solutions that allow business rule extraction for migration from legacy applications to modern applications. The foregoing discussion is intended only to illustrate aspects of the present field and should not be taken as a disavowal of claim scope.

SUMMARY

In embodiments, a system and method for business rule extraction for migration of application source code may include a method of selecting at least one application. In embodiments, the method may include parsing the source code and generating a first output. In embodiments, the method may include dynamically analyzing the source code to produce a second output wherein the second output comprises at least business rule and/or runtime metadata associated with the selected at least one application. In embodiments, the method may include converting, using said first output and said second output comprising runtime metadata, at least one of the source code of the selected application in an original language to a destination language on the second platform and a data source in an assigned format to a destination format. Other methods, systems, and apparatus descriptions and/or embodiments are also presented herein.

Aspects, features, details, utilities, and advantages of embodiments of the present disclosure will be apparent from reading the following description and claims, and from reviewing the accompanying drawings.

DETAILED DESCRIPTION

Legacy software is deeply embedded in customer organizations with extreme complexity. There are plethora of problems with such legacy applications, like the lack of agility, skills shortage, high costs of ownership, and increasingly complex regulatory compliance standards. In the new digital era, having information technology (IT) systems that are agile, proactive, flexible and prescriptive in real time is the key to business growth.

Legacy modernization provides solutions to all these problems and helps the customer get into a non-legacy distributed platform, for example, with enablement for cloud adoption, as well as digital and analytics capabilities. Customers typically face a number of challenges in maintaining business rules, such as, for example only, (i) business rules embedded in the source code; (ii) business rules modification due to a complex application; (iii) business rules not documented, leading to unclear requirements for development; (iv) how the business logic is implemented in the program objects (i.e., understanding the program flow); and (v) finalizing the scope to derive the future roadmap (for the migrated applications).

Before discussing the business rule extraction tool in detail, a general overview of business rules will first be set forth in order to provide context in regard to the extraction of business rules from the legacy application. A business rule may be described as a constraint on an operation of business and exercise a control on business operations. Business rules can be applied to, for example, people (e.g., employees, customers), processes (e.g., payments, shipping), as well as computer systems (e.g., archiving files). An example of a business rule might be if a customer payment on an invoice is late, then the payment status is overdue. Additionally, business rules can be used to implement rules and regulations required by governmental agencies (e.g., immigration status, work permits). Business rules can help an organization operate more efficiently and effectively, as well as consistently to improve customer and employee satisfaction.

Embodiments consistent with the instant teachings provide solutions to one or more of the above-identified challenges. Embodiments provide a business rule extraction tool platform to extract business rules from the source code.

Embodiments of the business rule extraction tool facilitate reverse engineering in an automated and/or semi-automated approach. Embodiments of the business rule extraction tool include features such as a multiline flowchart generator, a code auto remediation tool, seed analysis tool, flowchart download tool, and rule de-duplication tool that assists in accelerating the migration and/or modernization process and eliminates errors in the extraction of business rules that may occur during a manual process.

Additionally, embodiments of a business rule extraction tool handles a plurality of legacy computer programming languages, such as but not limited to Common Business Oriented Language (COBOL), PL/1, Natural, Assembler, Coolgen, Ab-Initio, VisualBasic 5 (VB5), Job Control Language (JCL), and the like. In an embodiment, the business rule extraction tool may be implemented as "Software as a Service" (SaaS) model. In such a delivery model, a customer can select and subscribe to different legacy languages based on the technology stack in their current enterprise IT portfolio.

Additionally, the design of the business rule extraction tool may comprise a plug and play framework platform, which helps integrating the new tool feature without disturbing the existing features. There is no limitation in the framework, it allows to integrate different open source tools quickly with little/no effort. The "On Premise installation" of an embodiment of the business rule extraction tool may be configured to help customers to avoid bringing source code base out of their enterprise network due to security reasons.

In general, embodiments of the business rule extraction tool are configured to extract business rules automatically and/or semi-automatically. In addition to mainframe technologies like COBOL, Customer Information Control System (CICS), Information Management System (IMS), DataBase 2 (DB2), Coolgen, Virtual Storage Access Method (VSAM) and the like, embodiments of the business rule extraction tool also support JAVA, C, C++, VisualBasic 6 (VB6), VB .NET, C# ("C sharp") applications. Embodiments of the business rule extraction tool also include features such as, for example, seed search analysis, rule de-duplication, flowchart and multi-flowchart generation that assists users in understanding the program flow and/or assisting in the business rule extraction process.

Before proceeding to a detailed description of various embodiments of a business rule extraction tool, a general overview of a larger legacy migration system will first be set forth in order to provide context in which the business rule extraction tool resides.

Figure 1:
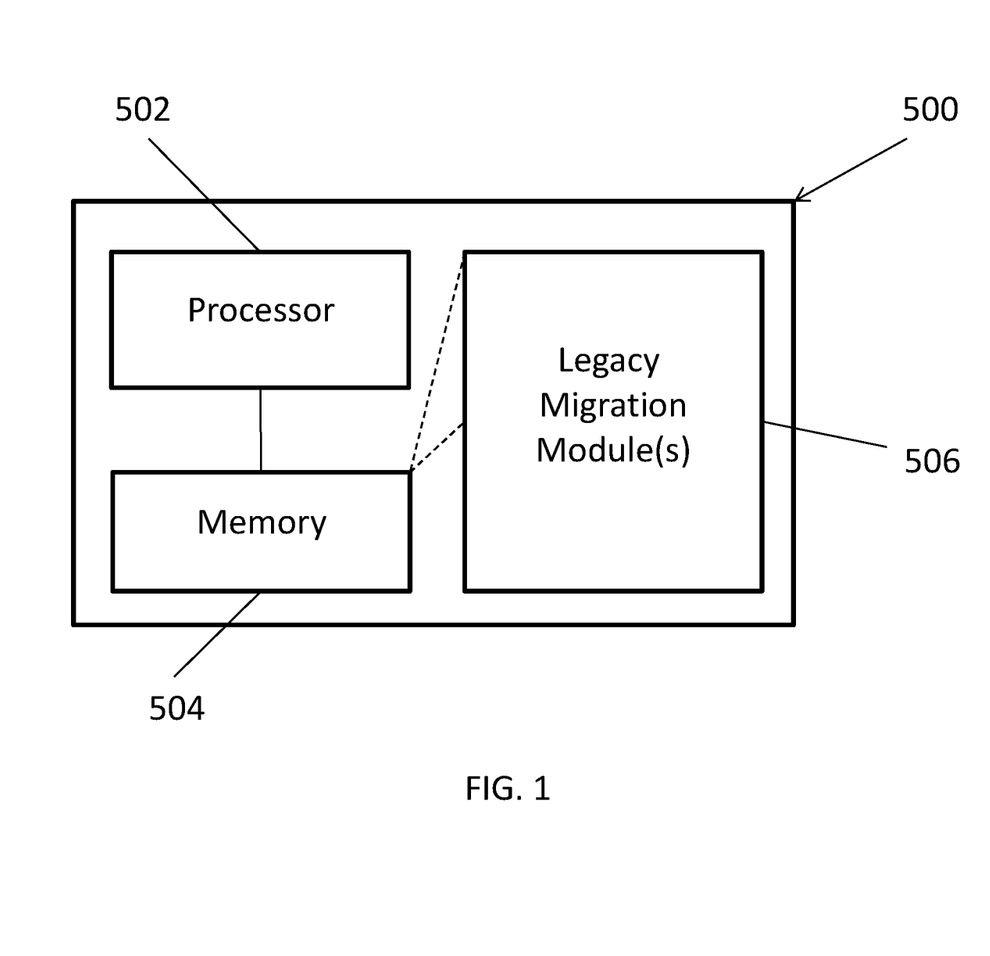
FIG. 1 is a block diagram generally illustrating an embodiment of a legacy migration tool in accordance with teachings of the present disclosure.

FIG. 1 is a simplified block diagram of a computer-implemented system 500, in an embodiment, for migrating legacy applications to a new, modern computing platform. In the illustrated embodiment, system 500 may include one or more processors 502, a memory 504, a variety of input/output mechanisms (not shown) such as a display, a microphone, a speaker, and a network interface (wired or wireless), and a legacy migration module (or modules) 506 configured generally to facilitate migration of legacy computer programs/applications.

Processor 502 is configured generally to control the overall operation of system 500, including coordination and cooperation among and between the other components of system 500. In an embodiment, processor 502 is configured to execute a suitable operating system. Processor 502 may include a central processing unit (CPU), memory (in addition to or such as the illustrated memory 504) and an input/output (I/O) interface through which processor 502 may receive a plurality of input signals and to generate a plurality of output signals.

Memory 504 is provided for storage of data and instructions or code (i.e., software) for processor 502. Memory 504 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 504 may be internal to processor 502.

Legacy Migration Generally.

Legacy migration module(s) 506 may include application programs stored in memory 504 and configured for execution by one or more processors 502, to achieve an overall function of legacy computer system migration. Generally, legacy migration module(s) 506 provides an accelerator platform for hosting various migration and modernization tools, and may include a modernization lifecycle based platform that facilitates a user migrating out of a legacy environment in a de-risked and accelerated way.

Legacy migration module(s) 506 may include the following components and/or layers. Generally, legacy migration module(s) 506 include a presentation layer, a service layer, a business layer, an integration layer, a data access layer, and a security layer. The presentation layer includes views that are built with Hypertext Markup Language 5 (HTML5) User Interface (UI) with Cascading Style Sheets 3 (CSS3) and jQuery UI elements via a bootstrap network. The data elements are pushed from the controllers into the view via models. Velocity templating engines are used for generating the menus. The service layer includes an application that exposes various services for maintaining the data sanity between the clients and the servers. The business layer includes the SaaS logic for utilizing various tools built with the experienced project execution and automation of the predictable work. The integration layer allows the tools to run in online/batch mode based on the time estimates for the successful completion. The users are kept updated via the email messages to ensure optimized time utilization for the end users. The data access layer includes hibernated entities that were used for the optimized effort utilization of the developer to allow them to focus on the core customer problems instead of the standard routine application problem. The security layer includes a spring security Application Program Interface (API) that is leveraged for interfacing with Lightweight Directory Access Protocol (LDAP) servers and controlling the usage of the features that the portal has to offer the user.

Figure 2:
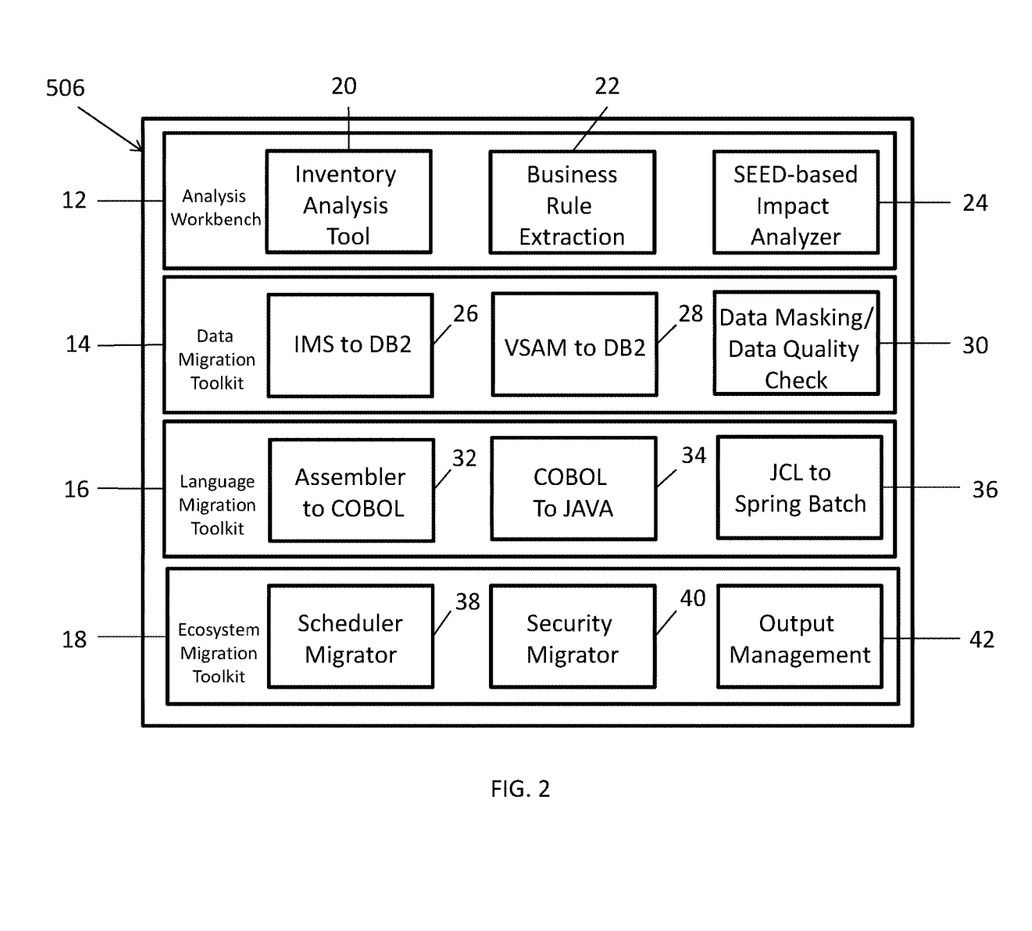
FIG. 2 is a block diagram generally illustrating in greater detail the legacy migration tool of FIG. 1.

In the illustrated embodiment, FIG. 2 is a simplified block diagram showing, in greater detail, the various functional module(s) included in legacy migration module 506. In this regard, legacy migration module(s) 506 may include one or more workbenches and/or toolkits that may contain one or more applications, tools, and/or modules (hereafter, the terms "applications", "tools", and "modules" may be used interchangeably), such as, but not limited to, an analysis workbench 12, a data migration toolkit 14, a language migration toolkit 16, and/or an ecosystem migration toolkit 18. It should be understood that each of the referred-to applications, tools, toolkits, workbench(es), and/or modules may comprise software stored in memory 504 and configured for execution by one or more processors 502.

Legacy migration module(s) 506 may be configured as a "Software as a Service" (SaaS), where users (e.g., customers), may subscribe (e.g., enroll), in one or more of the application toolkits 12, 14, and/or 16 described above. Users may configure one or more subscriptions to application to legacy migration module(s) according to predetermined attributes (e.g., cost, size, volume, and duration of usage). Legacy migration module(s) 506 may be configured to be accessed by way of the web (e.g., Internet), using a conventional web browser, or alternatively, can be configured as an "on premises installation" via hard copy installation.

With continued reference to FIG. 2, analysis workbench 12 may include one or more applications such as, but not limited to, an inventory analysis tool 20, a business rule extraction tool 22 (hereinafter "BRE 22"), and/or a seed based impact analyzer tool 24. Inventory analysis tool (IAT) 20 is configured generally as an inventory analysis tool platform to extract inventory of the code by way of analysis in an automated and semi-automated way, the details of which are set forth in co-pending U.S. application Ser. No. 15/397,492, filed on Jan. 3, 2017, (entitled "METHOD AND APPARATUS FOR INVENTORY ANALYSIS"), hereby incorporated by reference as though fully set forth herein.

BRE 22 provides analysis of the legacy code to extract business rules automatically and/or semi-automatically. In addition to mainframe technologies like COBOL, CICS, IMS, DB2, Coolgen, VSAM, and the like, the BRE 22 also supports JAVA, C, C++, VB6, VB .NET, C# applications.

The design of BRE 22, in an embodiment, (i) extracts business rules from the program automatically and saves the extracted business rules in a database; (ii) searches the program inventory for the seed search term entered by the user and displays the result; (iii) dynamically executes all of the source code, line by line, that may have been missed by static analysis; (iv) eliminates duplicate business rules that have been extracted and saved to the database; (v) analyzes the source code and displays the program flow; (vi) converts the business logic present in the program and generates English language versions of the business rules; (vii) allow a user to add a copybook variable, comment on a line of code, replace a line of code, and add new code; (viii) capture program logic flow and display the flow to the user; and (ix) display and/or download a flowchart. In embodiments, BRE 22 examines conditional and/or computational statements in the source code to extract the business rules present in the source code via static and dynamic analysis. BRE 22 dynamically extracts business rules to include (e.g., cover) portions of the source code that are not able to parsed statically. The BRE 22 will be set forth in greater detail below in connection with FIGS. 3-6.

Business rules extracted dynamically cover 100% of the source code. Dynamically analyzing the source code extracts rules that cannot be extracted using static analysis. Business rules do not change as a result of execution of source code. Rules that are extracted dynamically cannot be extracted 100% by static analysis. Therefore, some rules can be missed by static analysis. There is no cascading effect as a result of dynamic simulation. There is no difference between the business rules parameters of the system and specific application.

The data migration toolkit 14 may include one or more applications such as, but not limited to, a data migration tool(s) 26, 28 and/or a data masking/data quality check tool 30. The data migration toolkit 14 supports VSAM to DB2, IMS to DB2, and ADABAS (Adaptable Data Base System) to RDBMS (Relational Database Management System). In an embodiment, the IMS to DB2 module 26 may be configured to provide an end-to-end migration solution to migrate data from hierarchical database IMS DB to DB2, for example. The tool 26 may be configured to convert application code modification, Data Definition Language (DDL) for target schema generation, and data migration scripts, may provide intermediate optimization of target schema and re-create the Structure Query Language (SQL) statements and/or may convert the application code (JCL, PROC (JCL Procedure), COBOL) from IMS specific calls to DB2 compliant calls. The VSAM to DB2 database migrator 28 may be configured to provide an end-to-end migration solution to migrate data from files based data source VSAM to DB2. The tool may cover application code modification, DDL for target schema generation, and data migration scripts, provide intermediate optimization of target schema and re-create the SQL statements and/or convert the application code (JCL, PROC, COBOL) from VSAM specific calls to DB2 compliant calls. The database migrator toolkit 14 may be configured to provide one-to-many mapping where the optimizer may also provide abilities to set defaults, allow nulls, change data types and/or optimize the overall design. The database migration tools may also generate data migration programs based on the changes made by a user in schema using optimizer. The data masking and data quality check tools 30 may provide additional functionality. In order to protect sensitive data during database migration, the data masking tool may allow propagation of masked data as part of database migration process. A data quality checking tool may allow pre-quality checks on the data before the data/database is migrated.

The language migration toolkit 16 may include one or more applications such as, but not limited to, an assembler to COBOL tool 32, a COBOL to JAVA tool 34, and/or a JCL to spring batch tool 36, which facilitate conversion of a legacy application configured in a legacy programming language into a modern application configured in a modern programming language. The language migration toolkit 16 supports assembler to COBOL, COBOL to JAVA, COBOL to .Net, PL/1 to JAVA, Natural to COBOL, Natural to JAVA, JCL to Spring Batch, an JCL to Summer Batch. The assembler to COBOL tool 32 may be configured to convert assembler macros and copybooks into COBOL programs, for example, an may cover application code automated migration from second generation assembler language to third generation COBOL language, convert assembler copybooks to COBOL copybooks, and/or convert conditional assembly instructions to COBOL statements. Assembler to COBOL tool 32 may be configured to use a unique technique where it does not limit to static code analysis. The assembler to COBOL migration tool 32, in an embodiment, may simulate the assembler execution to resolve the registers and operands as necessary. The COBOL to JAVA tool 34 may be configured to convert COBOL programs into JAVA Plain Old Java Object (POJO) class. The tool 34 may support conversion from CICS COBOL/DB2 to Java/Oracle and may also supports file operations, and may be configured to ensure that there are no functional gaps due to automated migration process. Finally, JCL to Spring Batch tool 36 may be configured to convert JCL, COBOL, files to equivalent Eclipse Project containing Spring batch, tasklets, and Java POJO objects, and may provide pre-built Cloud-enabled java utilities that are equivalents of JCL utilities including SORT and database manipulations. A language migration toolkit embodiment may be seen by reference to co-pending U.S. application Ser. No. 15/397,473, filed on Jan. 3, 2017, (entitled "METHOD AND APPARATUS FOR MIGRATION OF APPLICATION SOURCE CODE"), hereby incorporated by reference as though fully set forth herein.

The ecosystem migration toolkit 18 may include one or more applications, such as, but not limited to, a scheduler migrator tool 38, a security migrator tool 40, and/or an output management tool 42. For example only, scheduler migrator tool 38 may be configured to migrate legacy schedules, such as CA-7, Control-M, CA-Unicenter, and the like, to a modern scheduler, like IBM Tivoli Workload Manager. Security migrator tool 40 may be configured to migrate application and system level security (like Resource Access Control Facility (RACF), TopSecret, and Access Control Facility 2 (ACF2)) to security systems for distributed platforms, like Active Directory. Output management tool 42 may be configured to migrate output, content and report management (like CA-View/Deliver, ASG-Mobius, and IBM FileNet).

Business Rule Extraction Tool.

Figure 3:
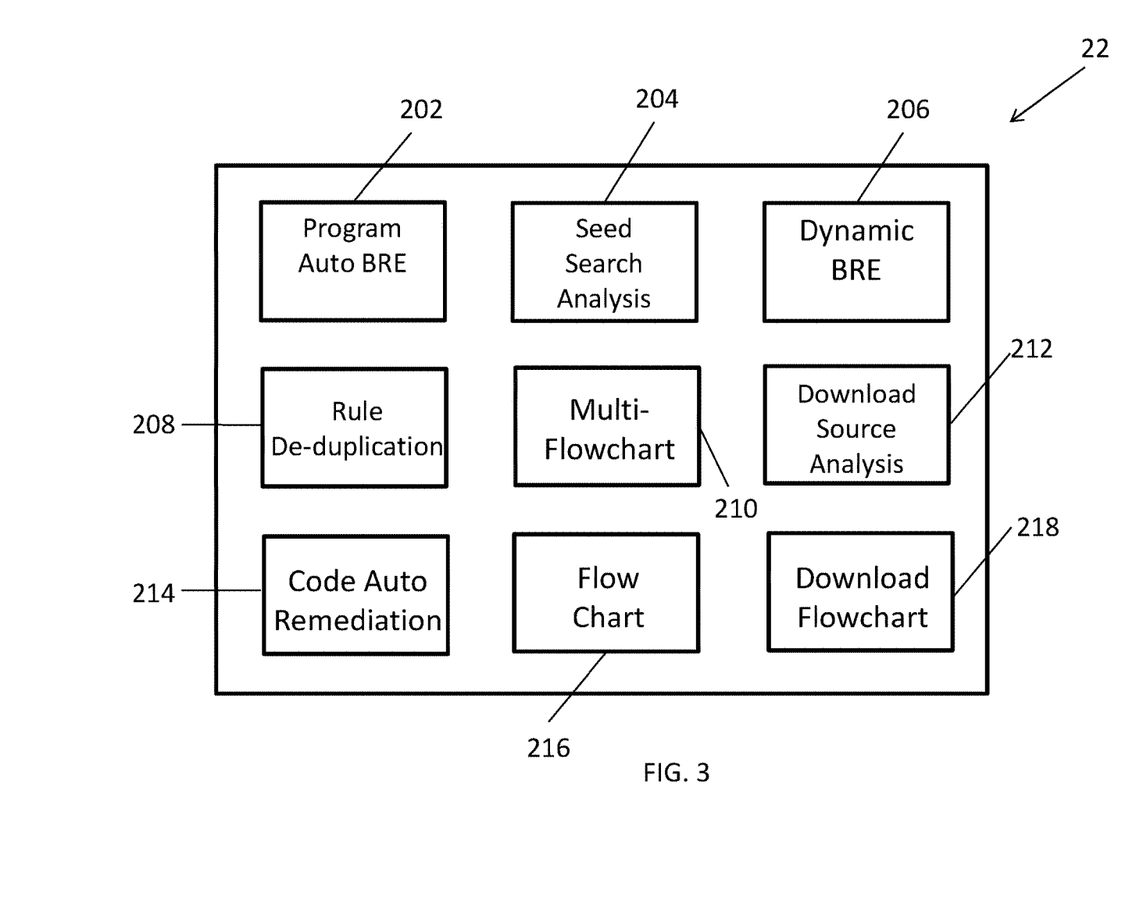
FIG. 3 is a block diagram generally illustrating an embodiment of a business rule extraction tool in accordance with teachings of the present disclosure.

FIG. 3 is a simplified block diagram showing, in greater detail, various functional blocks including in the BRE 22. As noted above, BRE 22 may be configured to extract business rules from the program (e.g., source code) automatically and may be configured to save the extracted business rules in a database. In embodiments, BRE 22 may be configured to search the program inventory for the seed search term entered by the user and may be configured to display the result. In embodiments, BRE 22 may be configured to dynamically execute all of the source code, line by line, that may have been missed by static analysis. In embodiments, BRE 22 may be configured to eliminate duplicate business rules that have been extracted and saved to the database. In embodiments, BRE 22 may be configured to analyze the source code and display the program flow. In embodiments, BRE 22 may be configured to convert the business logic present in the program and generates English language versions of the business rules. In embodiments, BRE 22 may be configured to allow a user to add a copybook variable, comment on a line of code, replace a line of code, and add new code. In embodiments, BRE 22 may be configured to capture program logic flow and display the flow to the user. In embodiments, BRE 22 may be configured to display and/or download a flowchart.

BRE 22 includes, generally, a program auto BRE module 202, a seed search analysis module 204, a dynamic BRE module 206, a rule de-duplication module 208, a multi-flowchart generator 210, a download source analysis module 212, a code auto remediation module 214, a flowchart generator 216, and a download flowchart module 218.

The program auto BRE module 202 comprises (i) a means or mechanism for extracting the business rules from the source code automatically or semi-automatically and saves the extracted business rules in a database; (ii) a means or mechanism for downloading the extracted business rules in formats such as, Excel and/or Portable Document Format (PDF); (iii) a means or mechanism for parsing the source code into the database; (iv) a means or mechanism for removing un-parseable characters of the source code; (v) a means or mechanism for formatting the parsed source code; (vi) a means or mechanism for classifying the parsed source code; (vii) a means or mechanism for identifying logical conditions and the child statements of the logical conditions; and (viii) a means or mechanism for providing the logical and child statements to the user.

A seed is the term used to identify variables that are used in programming languages for programming. The import of the seed search is an output that gives the impacted variables and lines of source code that can be used for analysis. Seed is identified by the user based on the requirements provided by the customer. For example, if the customer wants to identify how the private information data is used in the program and for business purposes then we can use the seed corresponding to the private information data and get the seed impact. Seed search result is used to identify the business rules that are coded in the program using the seeds.

The seed search analysis module 204 comprises (i) a means or mechanism for searching the source code inventory for the seed entered and displays the result(s) to the user; (ii) a means or mechanism for searching for the seed that matches exactly with the variables in the source code inventory and displays the result(s) to the user; (iii) a means or mechanism for searching for the seed that matches partially with the variables in the source code inventory and displays the result(s) to the user. The seed matching the variables in the source code inventory is displayed and the program(s) that include the seed are displayed; (iv) a means or mechanism for searching for a base seed and a reference seed that matches exactly with the variables in the source code inventory and displays the result(s) to the user. The seed matching the variables in the source code inventory is displayed and the program(s) that include the seed are displayed; and (v) a means or mechanism for searching for a base seed and a reference seed that matches partially with the variables in the source code inventory and displays the result to the user.

In embodiments, a user enters a seed variable and selects one or more options as described above. The seed search analysis module 204 parses the input inventory folder for the seed variable and/or impacted variable. In the case of an indirect seed search, the seed search analysis module 204 does a recursive search and finds the impact variable of the reference seed. The seed search analysis module 204 writes the results of the search to a report stored in the database. The seed search analysis module 204 displays the results to the user via the view report tool option.

In embodiments, a seed is a term used to identify variables that are used in programming languages (e.g., COBOL). The output of a seed search is list of impacted variables and/or lines of code that can used for subsequent analysis. In embodiments, a seed is identified by the user according to a predetermined requirement (e.g., customer requirement). For example, if the customer wants to identify how private information data is used in the source code and/or for business purposes, the seed search analysis module 204 is used to find the seed corresponding to the private information data and provide the impact of the seed on the source code. In embodiments, seed search analysis module 204 is used to identify the business rules that are present in the source code using the seed. The seed matching the variables in the source code inventory is displayed and the program(s) that include the seed are displayed to the user.

The dynamic BRE module 206 comprises (i) a means or mechanism for executing the source code line-by-line to include any lines that may have been missed by static analysis. The execution covers all of the source code (e.g., COBOL) that may not be possible to include in static analysis, including all of the logical paths of the source code; (ii) a means and mechanism for uploading the source code coverage report to legacy migration module 506; (iii) a means or mechanism for parsing the source code coverage report; (iv) a means or mechanism for checking the quantity of the source code tested using an identifier in the code coverage report; (v) a means or mechanism for producing an Excel file and/or a pie chart that displays the status of each line of source code; and (vi) a means or mechanism for generating a report that displays that execution status of each line of source code. In embodiments, the user uploads the code coverage report to the Exit Legacy tool generated by the mainframe. The Exit Legacy tool parses the code coverage report. The Exit Legacy tool checks how much code has been tested by way of an identifier in the code coverage report. The Exit Legacy tool produces an Excel file together with a pie chart that displays the status of each line of code. The user can view the report via the BRE 22 tool window that displays with an identifier that shows which code has been executed (e.g., simulated) or not executed (e.g., not simulated).

The rule de-duplication module 208 comprises (i) a means or mechanism for eliminating duplicate business rules and that were extracted and saved to the database; (ii) a means or mechanism for parsing the extracted business rules; and (iii) a means or mechanism for determining whether an extracted business rule matches any other extracted business rule. If the extracted business rule matches any other extracted business rule by more than a predetermined amount (e.g., 50%), the business rule is identified (e.g., highlighted), and displayed to the user.

The multi-flowchart generator 210 comprises a means or mechanism for analyzing the source code and displaying the program flow on the Exit Legacy tool with the option to expand the flowchart for the paragraph on the click of the button. The tool parses the source code and merging lines of code based on COBOL keywords. The tool creates a multimap with section names as the key and executable code as the value(s). The tool creates a variable map and parses the working storage section, making a list of all possible variable names along with their data types. The tool creates a table with a naming convention ("COBOL_FILE_FILE_NAME"). The tool creates a table for each file that flowchart is generated. Columns are defined as "ID(INT) (PK)", "ACTUAL_CODE(CHAR)", "TYPE(CHAR)", "BOX TYPE(CHAR)", "ORIG_PARA(CHAR)", "EXIT_PARA(CHAR)", "SKIP_EXIT(BOOLEAN)". The tool loops through the code multimap created during parsing of the code. The tool reads the data back from the table and generates multiple flowcharts according to the number of sections the file contains. There will be at least one flowchart that will list all the sections only and list the section that it is linked to. The file name may be ("FILE_NAME_MAIN_graph.html"). The flowchart is used to quickly navigate between different modules. Each section has its own flowchart. Perform statements (e.g., a subroutine in COBOL) are linked to other flowcharts containing details of the section called by Perform. The process is similar to "GO TO" statements. The user can navigate between flowcharts using the Perform statements and/or the main graph generated earlier by the tool. The naming convention for the file generated may be ("FILENAME_SECTIONNAME_graph.html"). The tool generates a text tile for each section that will have the box type, name, color, and/or the linkage between the boxes. A final rendering of the flowchart can be made using Dot.exe provided by Graphviz in .SVG (Scaleable Vector Graphics) format.

The download source analysis module 212 comprises (i) a means or mechanism for converting the business logic present in the program and generates English language statements of the extracted business rules to a Word document; (ii) a means or mechanism for parsing the source code of the uploaded program; (iii) a means or mechanism for converting the technical source code into the English language; (iv) a means or mechanism for identifying copybooks used in the program; (v) a means or mechanism for writing the converted source code and identified copybooks to a Word document; and (vi) a means or mechanism for a user to download the Word document.

The code auto remediation module 214 comprises (i) a means or mechanism for adding a copybook variable by allowing a user to specify a copybook variable that can be added to the copybook; (ii) a means or mechanism for allowing a user to specify the location in the copybook where the variable needs to be added; (iii) a means or mechanism for allowing the user to specify the existing copybook variable that needs to be replicated for its definition; (iv) a means or mechanism for allowing a user to comment on a specific line of code in the inventory; (v) a means or mechanism for allowing a user to replace a specific line of code with new code in the inventory; (vi) a means or mechanism for allowing a user to add new code in the inventory and to specify the location of the code where the new code is to be inserted; (vii) a means or mechanism for parsing the source code; and (viii) a means or mechanism for implementing the business logic and updating the source code depending on the option selected by the user. In embodiments, the Exit Legacy tool parses the source code from a folder. Depending on the option selected by the user, the tool implements the logic and/or updates the source code in the input folder.

The flowchart generator 216 comprises (i) a means or mechanism for capturing program logic flow; and (ii) a means or mechanism for displaying captured program logic flow in a flowchart.

The download flowchart generator 218 comprises (i) a means or mechanism for downloading a flowchart in PDF format; (ii) a means or mechanism for displaying to the user via a Graphical User Interface (GUI) the flowchart and the option to download the flowchart; (iii) a means or mechanism for parsing the source code, generating a flowchart of the source code, and displaying the flowchart to the user; and (iv) a means or mechanism for displaying to the user a download flowchart link via the GUI and saving the flowchart in PDF format.

Figure 4:
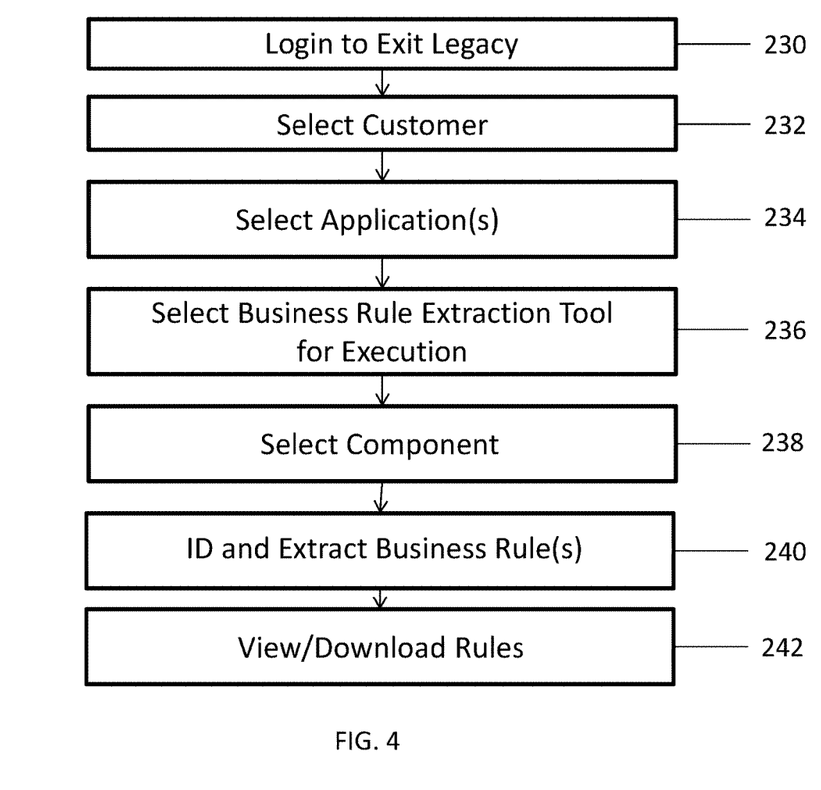
FIG. 4 is a flowchart generally illustrating an embodiment of a method and apparatus for business rule extraction.

FIG. 4 is a high-level flowchart diagram illustrating, in an embodiment, the operation of a method of operation of the BRE 22 included in the larger legacy migration tool 506. The method begins in step 230.

In step 230, a user may access BRE 22 by first logging into the legacy migration tool 506 (e.g., "Exit Legacy") via a graphical user interface (GUI). The method then proceeds to step 232.

In step 232, the user may select a customer via the GUI (e.g., a drop-down list). The method then proceeds to steps 234 and 236.

In steps 234 and 236, the user may first select via the GUI one or more toolkits/workbenches available for selection from the legacy migration tool 506 (e.g., see FIG. 2), one or more application workbenches and/or toolkits 12, 14, 16, and/or 18 and/or one or more applications 20, 22, 24, 26, 28, 30, 32, 34, 36, 38, 40, and/or 42 may be displayed via the GUI in step 56). For example, to access the business rule extraction tool 22, the user selects BRE 22 from the GUI in step 236. It should be understood that toolkits 12, 14, 16, and/or 18 and/or applications 20, 22, 24, 26, 28, 30, 32, 34, 36, 38, 40, and/or 42 displayed to the user via the GUI (e.g., drop down list), and/or may be configured to correspond to a subscription service and/or usage agreement assigned to the user. The method proceeds to step 238.

In step 238, once the user has selected BRE 22 in step 236, the user may select one or more components of BRE 22 to be executed (run), such as program auto BRE module 202, seed search analysis module 204, dynamic BRE module 206, rule de-duplication module 208, multi-flowchart generator 210, download source analysis module 212, code auto remediation module 214, flowchart generator 216, and/or download flowchart module 218. The method then proceeds to step 240.

In step 240, a user executes the selected components of the BRE 22 and the BRE 22 may identify and/or extract business rules in the source code. The method then proceeds to step 242.

In step 242, the BRE 22 may execute and/or generate output, including, but not limited to, one or more reports that are displayed (e.g., provided to).

Figure 5:
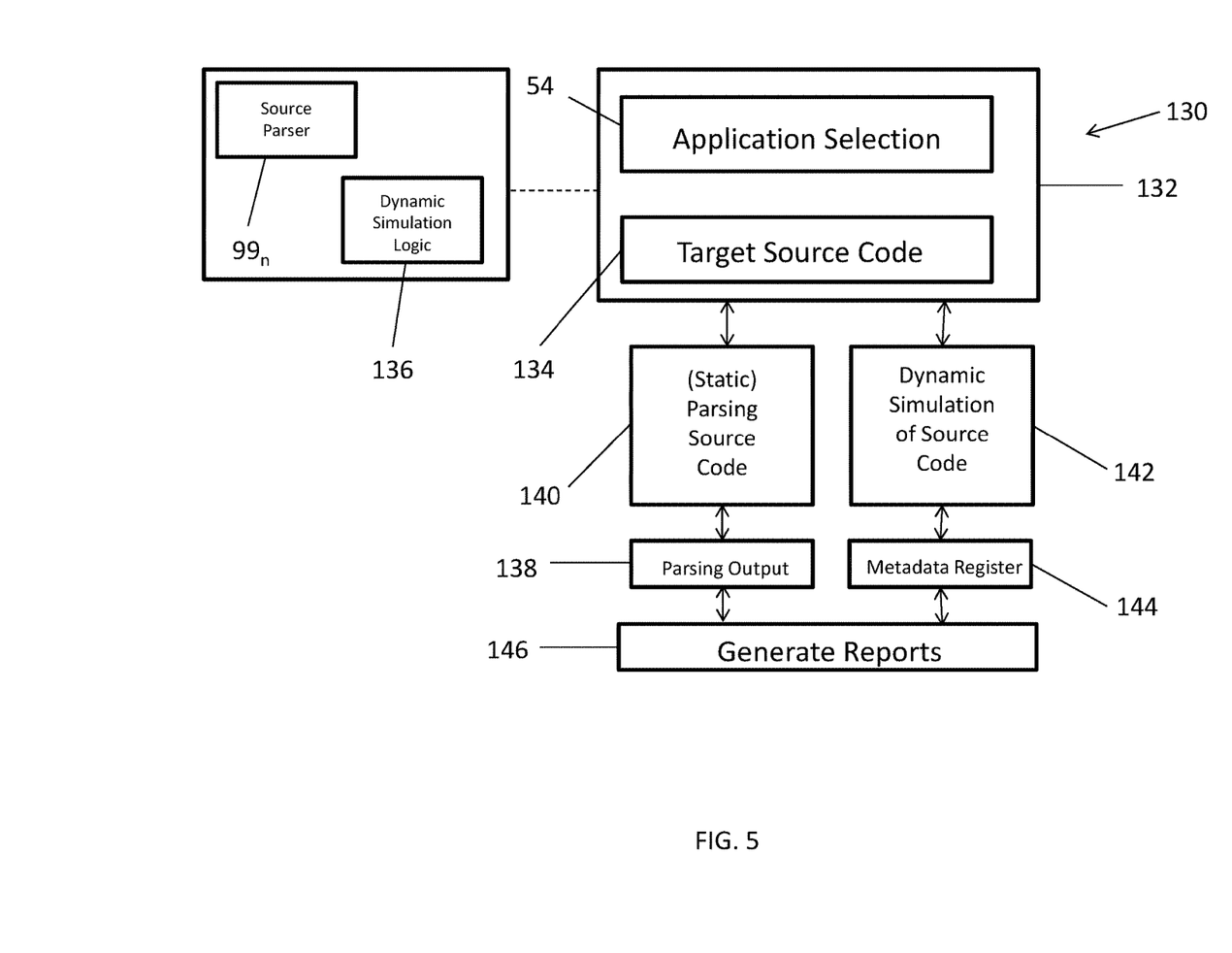
FIG. 5 is a block diagram generally illustrating a dynamic code simulation feature of the method and apparatus for business rule extraction of FIG. 3.

FIG. 5 is a simplified block diagram showing, in greater detail, the execution of the BRE 22, designated broadly as source code processing 130. Source code processing 130 includes defining target source code 132. As described above in connection with FIG. 3, a user can first select an application (see step 234 in FIG. 4). By virtue of this selection, a target source code is defined, represented as block 134. It should be understood that this may be performed by identifying the source code file(s) in inventory as a result of the user selection of the application. Additionally, BRE 22 also includes a dynamic code simulation module 136, stored in memory 504, and configured to be executed by one or more processor(s) 502. While the parser module 99n is configured to parse the target source code in a conventional sense of the term parsing, the dynamic code simulation module 136 is configured to dynamically simulate execution of the code for purposes to be described below. Thus, as shown in FIG. 5, once the target source code 134 has been selected/identified, it is acted upon by parser module 99n suited to the specific programming language (e.g., COBOL, etc.), whose parser outputs are designated by block 138, as well as being acted upon by the dynamic simulation module 136. This is represented by the parallel paths shown in FIG. 5.

Dynamic code analysis is used to identify business rules. It is used to identify business rules by navigating through the executable source code. By navigating through every executable line of the source code, business rules are extracted. Dynamic code analysis uses built-in intelligence to extract the business rules whereas parsing is just reading of the source code.

With continuing reference to FIG. 5, the parser outputs are acted upon by the dynamic simulation module 142. In dynamic simulation module 142, BRE 22 simulates the memory of each application component without actually running the component on a given platform (e.g., COBOL). BRE 22 creates (e.g., simulates), multiple memory arrays (dynamic memory array 144, shown in detail in FIG. 6), that are dynamic and may hold different types of data (e.g., constants, numeric, alphanumeric, and/or addresses). Dynamic simulation module 142 resolves and detects run-time parameters of the source code by monitoring the progress of the simulation. Dynamic simulation module 142 captures resolved and detected parameters which are stored in metadata register 144. Parsing output 138 and metadata register 144 are used by BRE 22 for analysis and generation of reports as well as conversion to a different language and/or database.

Dynamic Code analysis is not conventional and has been developed for business rules extraction. Dynamic code analysis is not an off-the-shelf application. It operates only on source codes and is used for analyzing the executable lines of code for business rules extraction. Execution of code involves actually executing the executable code line by line and traversing the logical path followed during execution and extracting the business rules. Simulation, on other hand, involves assuming the execution of the code and the logical path that is followed for extracting the business rules. Static outputs along with dynamic outputs are used to cover 100% of the lines of code and extract business rules. Static output in itself cannot cover 100% of the lines of code for analysis. Therefore, dynamic analysis is used to cover 100% of the lines of code. In embodiments, the BRE 22 looks for the conditional and computational statements in the source code to extract the business rules in static and dynamic analysis.

Figure 6:
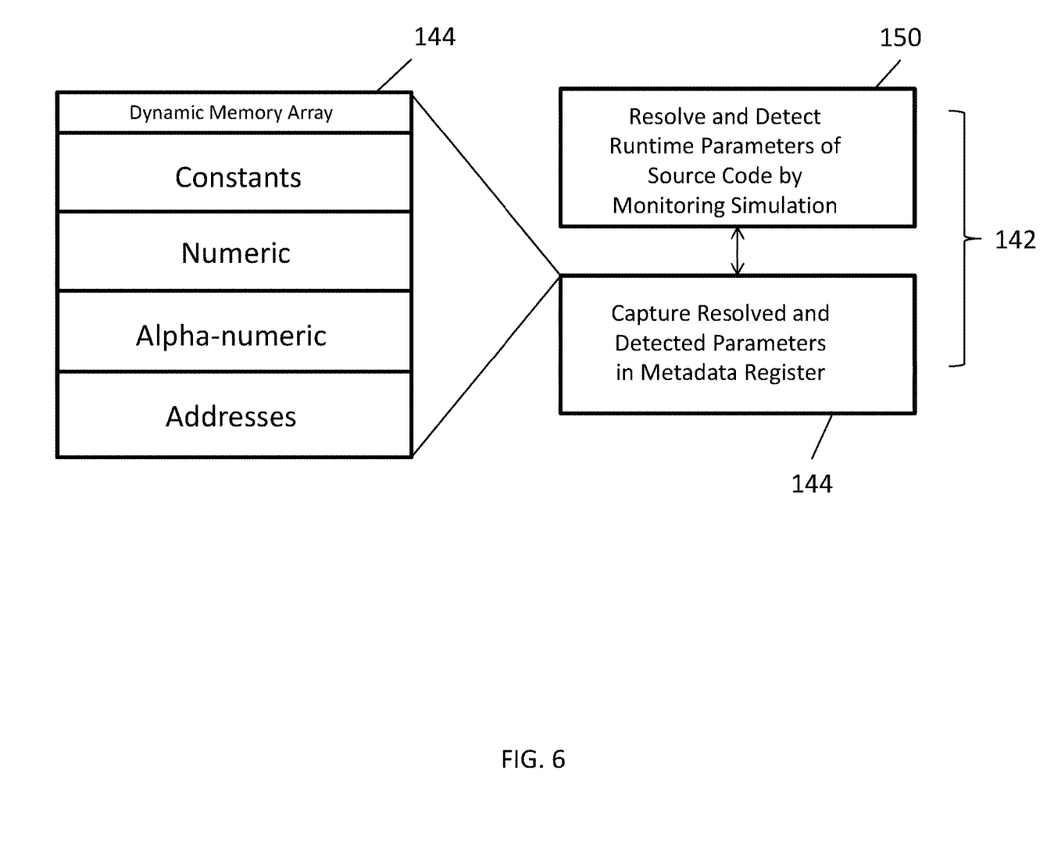
FIG. 6 is a block diagram generally illustrating in greater detail the dynamic code simulation feature of FIG. 5, in an embodiment.

FIG. 6 is a simplified block diagram showing, in greater detail, the execution of BRE 22, designated broadly as dynamic memory array 144 and dynamic simulation of source code module 142, including resolve and detect run-time parameters of source code by simulation module 150 and capture resolved and detected parameters in metadata register 144. The simulation (e.g., execution) of the source code generates dynamic data, stored in dynamic memory array 144. BRE 22 is configured to analyze the inventory of the program in a statically via parsing of the source code and dynamically via simulating the source code. The parsing output 138 and the metadata register 144 are used by BRE 22 to generate reports pertaining to the source code that include all components of the source code are inventoried and classified by BRE 22.

The relationship between static parsing and dynamic parsing can be explained as follows. Static parsing involves parsing and analyzing the static code and extracting the business rules whereas dynamic parsing involves parsing and analyzing the executing code to extract business rules. Static parsing alone does not cover 100% of the code. Static parsing along with Dynamic parsing parses 100% of the source code for analysis and extracting the business rules.

It should be understood that a processor (e.g., processor 502), as described herein may include a conventional processing apparatus known in the art, capable of executing preprogrammed instructions stored in an associated memory, all performing in accordance with the functionality described herein. To the extent that the methods described herein are embodied in application source code, the resulting application source code can be stored in an associated memory, such as memory 504, and can also constitute the means for performing such methods. Such a system or processor may further be of the type having both ROM, RAM, a combination of non-volatile and volatile (modifiable), memory so that any application source code may be stored and yet allow storage and processing of dynamically produced data and/or signals.

In embodiments, a memory (e.g., memory 504), may be configured for storage of data, instructions, and/or code (e.g., dynamic simulation logic 136), and is coupled to at least a corresponding processor. Memory may include various forms of non-volatile (e.g., non-transitory), memory including flash memory, read only memory (ROM), including various forms of programmable read only memory (e.g., PROM, EPROM, EEPROM), and/or volatile memory such as random access memory (RAM), including static random access memory (SRAM), dynamic random access memory (DRAM), and/or synchronous dynamic random access memory (SDRAM). Although memories and processors may be illustrated as separate components, it should be understood that, in embodiments, a memory may be internal to a processor.

Display devices may be configured to display aspects of GUIs, which may be generated by the operation of logic (e.g., dynamic simulation logic 136). Display devices may be, for example only, a liquid crystal display or light emitting diode display or other technologies known in the art. Display devices may function as only an output device with input received through other I/O devices (e.g., I/O devices), such as a keyboard or mouse (not shown). Alternatively, display devices may also function as an input device and may include a touch screen display including, for example, capacitive and/or resistive touch screen displays, and/or other technologies known in the art.

It should be further understood that an article of manufacture in accordance with this disclosure includes a non-transitory computer-readable storage medium (e.g., memory 504), having a computer program encoded thereon for implementing logic and other functionality described herein. The computer program may include code to perform one or more of the methods disclosed herein. Such embodiments may be configured to execute on one or more processors, multiple processors that are integrated into a single system or are distributed over and connected together through a communications network, and/or where the network may be wired or wireless. Code for implementing logic may, when executed by a processor, cause a plurality of transistors to change from a first state to a second state. A specific pattern of change (e.g., which transistors change state and which transistors do not), may be dictated, at least partially, by the logic and/or code. For example, and without limitation, in embodiments, processor of system may include a plurality of transistors that change state according to logic and/or code that implements logic.

In embodiments, the term "module" includes an identifiable portion of computer code, computational instructions, executable instructions, data, and/or a computational object to achieve a particular function, operation, processing, and/or procedure. A module may be implemented via software, hardware/circuitry, or a combination of software and hardware. A module, for example, may comprise one or more physical or logical blocks of computer instructions that may, for instance, be organized as an object, procedure, or function. In embodiments, executables of a module may not be physically located together and/or may include disparate instructions stored in different locations which, when joined logically together, may comprise the module and/or achieve the stated purpose for the module. In embodiments, a module may include a single instruction, many instructions, and/or may be distributed over several different code segments, among different programs, and/or across several memory devices. In embodiments, modules may represent data and may be embodied in any suitable form and/or may be organized within any suitable type of data structure. The represented data may be collected as a single data set and/or may be distributed over different locations, such as different storage/memory devices.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like), are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

Any element in a claim that does not explicitly state "means for" performing a specified function, or "step for" performing a specific function, is not to be interpreted as a "means" or "step" clause as specified in 35 U.S.C. § 112, paragraph 6 (pre-AIA), or 35 U.S.C. § 112(f) (AIA). In particular, the use of "step of" in the claims is not intended to invoke the provisions of 35 U.S.C. § 112, paragraph 6 (pre-AIA) or 35 U.S.C. § 112(f) (AIA).

What is claimed is:

1. A computerized method comprising the steps of:
    selecting at least one application having a source code;
    parsing the source code for business rules and generating a first output;
    dynamically analyzing the source code for business rules by simulating the memory of the at least one application having the source code and simulating execution of the source code within the simulated memory to produce a second output wherein the second output comprises runtime metadata associated with the selected at least one application, wherein the dynamically analyzing the source code further comprises:
        simulating memory to simulate execution of the source code by creating at least one dynamic memory array;
        simulating the execution of the source code within the dynamic memory array;

detecting and resolving parameters of the source code by monitoring the simulated execution of the source code;

storing the detected and resolved parameters of the source code in a metadata register; and generating at least one report of the source code based upon the detected and resolved parameters stored in the metadata register;

extracting and parsing the business rules, comparing the business rules for similarity and duplication, and generating a flowchart of the business rules, wherein dynamically extracting includes portions of the source code that are not able to be parsed statically; and converting, using said first output and said second output comprising runtime metadata, at least one of:
(i) the source code of the selected application in an original language to a destination language; and
(ii) a data source associated with the selected application in an assigned format to a destination format.

2. The method of claim 1, further comprising classifying the source code according to functionality and updating an inventory classification table and summarizing an inventory of the source code.

3. The method of claim 1, further comprising parsing the source code to determine non-functional and duplicate source code, generating a natural language based query for searching the source code, and classifying business rules of the source code and identifying logical conditions of the business rules.

4. The method of claim 3, wherein identifying logical conditions of the business rules further comprises identifying child statements of the business rules and generating a report of the business rules and child statements of the business rules.

5. The method of claim 1, wherein detecting and resolving parameters of the source code by monitoring the simulated execution of the source code includes detecting and resolving registers and operands of the source code.

6. An article of manufacture, comprising:
a non-transitory computer storage medium having a computer program encoded thereon for business rule extraction, said computer program including code for:
selecting at least one application having a source code;
parsing the source code for business rules and generating a first output;
dynamically analyzing the source code for business rules by simulating the memory of the at least one application having the source code and simulating execution of the source code within the simulated memory to produce a second output wherein the second output comprises runtime metadata associated with the selected at least one application, wherein the dynamically analyzing the source code further comprises:
simulating memory to simulate execution of the source code by creating at least one dynamic memory array;
simulating the execution of the source code within the dynamic memory array;
detecting and resolving parameters of the source code by monitoring the simulated execution of the source code;
storing the detected and resolved parameters of the source code in a metadata register; and
generating at least one report of the source code based upon the detected and resolved parameters stored in the metadata register;
extracting and parsing the business rules, comparing the business rules for similarity and duplication, and generating a flowchart of the business rules, wherein dynamically extracting includes portions of the source code that are not able to be parsed statically; and
converting, using said first output and said second output comprising runtime metadata, at least one of:
(i) the source code of the selected application in an original language to a destination language; and
(ii) a data source associated with the selected application in an assigned format to a destination format.

7. The article of manufacture of claim 6 wherein said computer program includes code for:
(i) analyzing the source code for obsolete and unwanted components;
(ii) deleting obsolete source code; and
(iii) verifying, extracting, and identifying the source code prior to simulated execution.

8. The article of manufacture of claim 6 wherein said computer program includes code for:
(i) classifying the source code according to functionality;
(ii) updating an inventory classification table; and
(iii) summarizing an inventory of the source code.

9. The article of manufacture of claim 6 wherein said computer program includes code for:
(i) parsing the source code to determine non-functional and duplicate source code;
(ii) generating a natural language based query for searching the source code; and
(iii) classifying business rules of the source code and identifying logical conditions of the business rules.

10. The article of manufacture of claim 6 wherein said computer program includes code for:
(i) identifying child statements of the business rules; and
(ii) generating a report of the business rules and child statements of the business rules.

11. The article of manufacture of claim 6 wherein said computer program includes code for:
(i) extracting and parsing the business rules;
(ii) comparing the business rules for similarity and duplication; and
(iii) generating a flowchart of the business rules.

12. The article of manufacture of claim 6 wherein said computer program includes code for detecting and resolving registers and operands of the source code.

13. A system comprising:
one or more computing devices including a memory having program code stored therein and a processor in communication with the memory for carrying out instructions in accordance with the stored program code, wherein the program code, when executed by the processor, causes the processor to:
select at least one application having a source code;
parse the source code for business rules and generating a first output;
dynamically analyze the source code for business rules by simulating the memory of the at least one application having the source code and simulating execution of the source code within the simulated memory to produce a second output wherein the second output comprises runtime metadata associated with the selected at least one application, wherein the dynamically analyzing the source code further comprises:
simulating memory to simulate execution of the source code by creating at least one dynamic memory array;
simulating the execution of the source code within the dynamic memory array;

detecting and resolving parameters of the source code by monitoring the simulated execution of the source code;

storing the detected and resolved parameters of the source code in a metadata register; and generating at least one report of the source code based upon the detected and resolved parameters stored in the metadata register;

extract and parse the business rules, compare the business rules for similarity and duplication, and generate a flowchart of the business rules, wherein dynamically extracting includes portions of the source code that are not able to be parsed statically; and convert, using said first output and said second output comprising runtime metadata, at least one of:

(i) the source code of the selected application in an original language to a destination language; and (ii) a data source associated with the selected application in an assigned format to a destination format.

14. The system of claim 13, wherein classifying the source code according to functionality and updating an inventory classification table and summarizing an inventory of the source code.

15. The system of claim 13, wherein dynamic analyzing the source code further comprises parsing the source code to determine non-functional and duplicate source code, generating a natural language based query for searching the source code, and classifying business rules of the source code and identifying logical conditions of the business rules.

16. The system of claim 13, wherein detecting and resolving parameters of the source code by monitoring the simulated execution of the source code includes detecting and resolving registers and operands of the source code.

* * * * *